United States Patent [19]

Campau

[11] Patent Number: 5,284,176
[45] Date of Patent: Feb. 8, 1994

[54] BATTERY REFILL SYSTEM

[75] Inventor: Daniel Campau, Grand Rapids, Mich.

[73] Assignee: Flow-Rite Controls, Ltd., Grand Rapids, Mich.

[21] Appl. No.: 907,930

[22] Filed: Jun. 30, 1992

[51] Int. Cl.$^5$ .......................................... F16K 31/126
[52] U.S. Cl. ................................. 137/260; 138/125; 429/64
[58] Field of Search ................ 137/453, 454, 260; 138/118, DIG. 7, 177, 428, 125, 126; 429/63, 64, 70, 73, 80; 526/255

[56] References Cited

U.S. PATENT DOCUMENTS

| | | | |
|---|---|---|---|
| 2,393,967 | 12/1942 | Brubaker | 526/255 |
| 3,616,824 | 11/1971 | Orlando | 429/63 |
| 3,857,415 | 12/1974 | Morin | 138/125 X |
| 3,990,479 | 11/1976 | Stinc et al. | 138/125 |
| 4,330,017 | 5/1982 | Satoh | 138/126 |
| 4,527,593 | 7/1985 | Campau | 137/393 |
| 4,754,777 | 7/1988 | Frode | 137/454 X |
| 5,048,557 | 9/1991 | Campau | 137/393 X |
| 5,090,442 | 2/1992 | Campau | 137/393 X |

*Primary Examiner*—Martin P. Schwadron
*Attorney, Agent, or Firm*—Niro, Scavone, Haller & Niro

[57] ABSTRACT

An improved battery refill system for filling and maintaining a number of interconnected battery cells at a predetermined level with liquid provided by an external liquid supply. The refill system includes a number of refill valves, each associated with a single battery cell, and a main supply valve which connects the battery cells to the liquid supply. Tubing is provided for connecting the battery cells in a chain or serial relationship. The tubing is fabricated from a plymeric material which, over an operating temperature range of between about $-20°$ F. and $200°$ F., is substantially free of plasticizer bleed. The tubing is also sufficiently conformable and resilient over its service temperature range so as to remain in leak-tight engagement on both the barbed fittings and the compression fittings found in conventional battery watering systems.

8 Claims, 2 Drawing Sheets

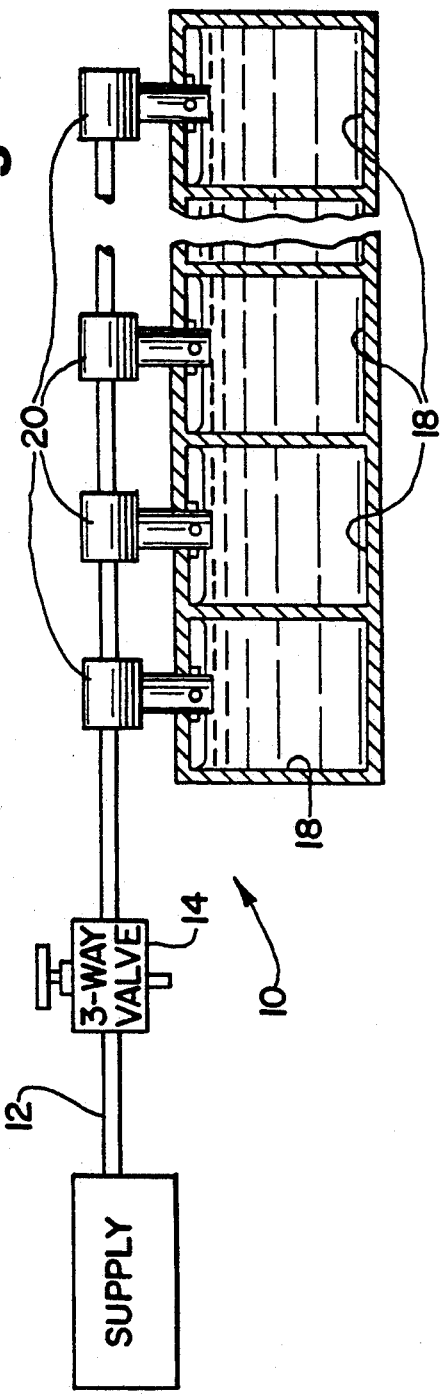

BATTERY REFILL SYSTEM

BACKGROUND OF THE INVENTION

U.S. Pat. Nos. 5,048,557, 5,090,442, and 4,527,593 are each incorporated herein by reference into this disclosure.

The present invention relates generally to a battery refill system used for filling battery cells to a predetermined level and for automatically monitoring and maintaining the battery cells at that level. More particularly, the present invention defines the material parameters of tubing which has found a particularly advantageous use within the battery refill system. This tubing may be used with any of the inventions, and particularly the refill valves, disclosed in U.S. Pat. Nos. 5,048,557 and 5,090,442.

It is standard practice in the field of industrial battery watering to use a flexible polyvinyl chloride ("PVC") thermoplastic tubing to interconnect automatic shut-off valves (such as those disclosed in U.S. Pat. Nos. 5,048,557 and 5,090,442) which are mounted on each cell of a battery to be filled within a battery watering system. The watering system is intended to last the life of the battery (five years or longer). A common water supply feeds water to each cell through the thermoplastic tubing.

It has been widely observed that the thermoplastic tubing mounted on such battery cells tends to discolor, soften, and tactify with age. It was assumed that the softening was generally insignificant and that the discoloration and tactification were due to acid fumes and electrolyte migration occurring during the battery charging cycle. However, these thermoplastic tubing characteristics were not perceived as problems which would affect the reliability of the watering system, so long as no leakage occurred within the tubing. While it was felt that acid fumes and electrolyte migration might cause refill valves to lock in an open or closed position, the mechanism by which this occurred was not completely understood. In fact, it was previously understood that it was the evaporation of the fluid used to fill the battery cells which left a sticky residue between the main valve and seat, such as might create a premature shut-off condition (see U.S. Pat. No. 5,048,557).

A primary reason automatic watering systems are not more widely used is their susceptibility to apparent random failure due to valve contamination. It has been assumed that the specific source of the contamination is either sticky residue from the inside of the battery cells migrating into the valves, or contaminants carried by the water supply into the valve by the thermoplastic tubing.

It is now understood that PVC thermoplastic tubing deteriorates in a fashion which is particularly damaging to the refill valves used in a battery watering system. Specifically, it has been experimentally determined that the tactification found to occur within the thermoplastic tubing after a relatively short period of service on the top of the battery is not simply acid residue collecting on the tubing surface; rather, it is caused by a separation of the plasticizer found within such tubing from the plastic resin. This plasticizer "bleeding" allows the plasticizer to collect as a liquid on both the inside and the outside of the tubing. Further, it has been found that this plasticizer is immiscible in water, but migrates under the shear stress of the flowing water into the battery cell refill valves. This sticky plasticizer coats critical valve members and can cause malfunctions.

SUMMARY OF THE INVENTION

The present invention solves the tubing deterioration, tactification, and consequent valve malfunction problem described above, and is specifically directed to the type of tubing used to interconnect the various battery cells within the battery watering system.

Accordingly, a battery refill system is described for filling and maintaining a number of interconnected battery cells at a predetermined level with liquid provided by an external liquid supply. The refill system includes a number of refill valves, each associated with a single battery cell, and a main supply valve which connects the battery cells to the liquid supply. Tubing is provided for connecting the battery cells in a chain or serial relationship.

The tubing of the present invention is fabricated from a polymeric material which is substantially free of plasticizer bleed, and which has a minimum bend radius of about 2.50 inches. This tubing is capable of a service temperature range of between about $-20°$ F. and $200°$ F., and has a burst pressure of up to about 40 psi. Additionally, the tubing has a five-year minimum life, and does not degrade excessively when exposed to sulfuric acid, oil, ozone, or ultraviolet radiation.

The tubing of the present invention also is sufficiently conformable and resilient over its service temperature range so as to remain in leak-tight engagement on both the barbed fittings and the compression fittings found in conventional battery watering systems. For example, the tubing will not relax over time to the point where normal system working pressure would blow it off fittings or cause leaks. Finally, the tubing has an ultimate elongation of at least 250% at 73° F., to accommodate various barbed fittings, and a minimum five-year service life.

Tubing materials possessing operating and material characteristics within these specified parameters have been found in three groups; thermoplastic elastomers, fluorcarbons/fluoroelastomers, and fluoropolymers.

However, the tubing should also be economically available, since large quantities are needed and the economics of battery watering systems requires tubing which is not significantly higher in cost than the common variety of PVC tubing presently used in such systems. Of the three groups listed, it has been determined that the thermoplastic elastomers ("TYPES") best satisfy the performance and economy characteristics required for use in permanently mounted industrial battery watering systems.

In this specification, the term "burst strength" is defined to mean that water pressure experienced within the tubing which will cause the tubing to fail and render the tubing inoperable for its intended purpose. It has been determined that the pressure ranges experienced during the fill cycle in a typical battery watering system vary from atmospheric pressure to as much as about 35–40 psi.

In this specification, the term "minimum bend radius" is defined to refer to tubing which maintains a sufficient flexibility so that if it is formed into a certain bend radius (e.g., 3 inches), the internal area of the tubing, throughout a cross-section of the tubing taken at any point along its bent portion, will not decrease. In other words, tubing formed into this bend radius will not cause a decrease in flow rate over the service temperature range of the tubing, since the tubing will maintain sufficient flexibility to avoid deformation or buckling.

In this specification, the term "service temperature range" means the temperature range over which the tubing used in the battery watering system of the present invention can be expected to operate, and within which temperature range the tubing of the present invention will maintain its "minimum bend radius" and its "burst strength," as well as the other parameters mentioned above.

Therefore, it is one object of the present invention to provide a new tubing for connecting individual battery cells to a main water supply, while avoiding refill valve malfunction caused by the conventional tubing currently used in the field.

It is another object of the present invention to provide a tubing having enhanced performance characteristics, including the ability to maintain sufficient flexibility and elongation characteristics while retaining the required tension and compression set resistances necessary for a leak-tight fit, and maintaining these performance characteristics over a wide temperature operating range.

It is a further object of the present invention to provide a tubing which has sufficient strength to withstand the maximum pressures experienced during the fill cycle in conventional battery watering systems.

A still further object of the present invention is to provide an apparatus which preserves the advantages disclosed in U.S. Pat. Nos. 5,090,442, 5,048,557 and 4,527,593, including the location of valve components below a suitable cover, such as a battery cover, and the increase of valve service life by enabling the valve to resist the build-up of internal deposits.

BRIEF DESCRIPTION OF THE DRAWINGS

FIG. 1 is a schematic view illustrating the general arrangement of the system of the present invention as used to service a plurality of containers.

FIG. 2 is also a schematic view serving to illustrate the general arrangement of the system of the components which make up the container filling device of the present invention.

DESCRIPTION OF THE PREFERRED EMBODIMENT

Figure 3:
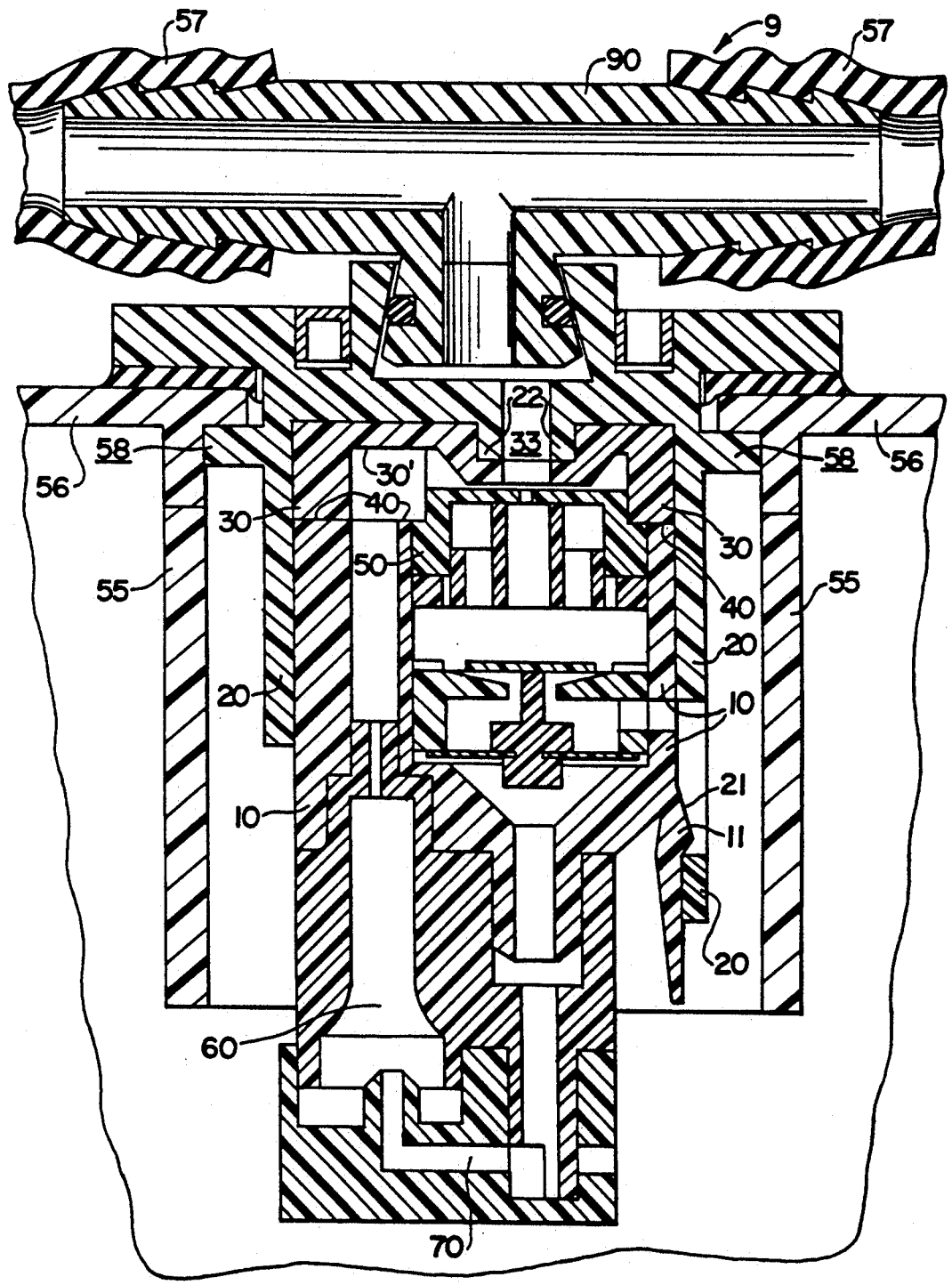
FIG. 3 is an enlarged side cross-sectional view of the refill valve apparatus described in U.S. Pat. No. 5,090,442.

Referring to the drawings, and particularly FIGS. 1 and 2, a container filling system and apparatus are illustrated. The system is designated generally as 10 and includes a liquid supply conduit 12 connected to a source of liquid under pressure, a liquid supply valve 14, and a plurality of container filling means 20, each servicing an individual container 18. Each filling means 20 is connected to conduit 12 via tap line 16 and includes a main valve means 30, a fluid amplifier means 70 and pilot valve means 80.

Conduit 12 provides an unobstructed flow passageway from valve 14 to each of the filling means 20 which operate to fill their respective containers independently of one another. Preferably, valve 14 is of a three-way design to permit opening or closing the system to the pressurized liquid supply or venting the system to atmosphere. The valve 14 may be manually or automatically operated and may be position, as shown in FIG. 1, at a remote location from the containers 18. Alternatively, separate valves may be employed in the tap lines 16 to actuate each filling means 20 separately.

The preferred embodiment of the present invention incorporates TPE tubing within a battery watering system for the interconnection of individual battery cells throughout the watering system. PVC tubing may still be used to connect the main supply valve to a water supply such as a reservoir, since it has been found that tactification within the tubing does not occur downstream of the main valve. The particularly preferred embodiment of the present invention incorporates a TPE known as NORPRENE ® made by Norton Company, which is made from a TPE known as SANTOPRENE ®. SANTOPRENE ® is a polyolefin TPE with a unique combination of environmental resistance (due to the presence of general purpose EPDM rubber) and fluid resistance (due to the presence of general purpose polychloroprene rubber). The fully vulcanized rubber particles of NORPRENE ® are dispersed throughout a continuous matrix of polyolefinic thermoplastic. NORPRENE ® is economical to manufacture since it can be produced on normal thermoplastic processing equipment, and its tubing scrap can be recycled, further contributing to its economy in use.

Another embodiment of the present invention which meets the required performance characteristics incorporates tubing made from fluorocarbons or fluorelastomers. VITON ®, manufactured by E.I. DuPont De Nemours Company, is one such tubing material that has been determined to be suitable from a performance standpoint. However, while tubing made from materials in this category offers physical, environmental and chemical properties which make such tubing functionally desirable, it is presently too expensive for general use in battery watering systems.

Yet another embodiment of the present invention which meets the required performance characteristics specified above incorporates tubing made from fluoropolymers, including the polymers known in the trade as PTFE, FEP, and PFA. A typical such polymer is DuPont's TEFLON ®. Another is CHEMFLUOR ®, made by Chemplast, Inc. of New Jersey. However, these types of tubing are presently very expensive and their use is typically confined to food, medical and semiconductor processing applications.

It should be understood that various changes and modifications to the illustrated preferred embodiment will be apparent to those skilled in the art. Such changes and modifications can be made without departing from the spirit and scope of the present invention and without diminishing its intended advantages. It is, therefore, intended that such changes and modifications be covered by the following claims.

I claim:

1. A battery refill system for filling and maintaining a plurality of interconnected battery cells at a predetermined level with liquid provided by an external liquid supply means, the system also including a plurality of refill valves, each valve being associated with a single battery cell, and at least one main supply valve for controlling the supply of the liquid to the battery cells and their respective refill valves, said system further comprising:

conduit means communicating between the main supply valve and the refill valves, said conduit means being constructed of a thermoplastic elastomer which, over a temperature range of between about −20° F. and 200° F., is substantially free of plasticizer bleed, has a minimum bend radius of about 2.50 inches, and has a burst strength of up to about 40 psi.

2. The battery refill system of claim 1, wherein said conduit means has an ultimate elongation of at least 250% at 73° F.

3. The battery refill system of claim 1, wherein said conduit means has a service temperature range of between 32° F. and 150° F.

4. The battery refill system of claim 1, wherein said conduit means has a burst strength of up to about 35 psi.

5. The battery refill system of claim 1, wherein said conduit means is sufficiently conformable and resilient so as to remain in leak-tight engagement on barbed fittings over said service temperature range.

6. The battery refill system of claim 1, each of the plurality of refill valves comprising:

an upper housing, a lower housing, and a main valve means contained within said upper and lower housings for controlling the supply of liquid to the container, said main valve means including a flexible main valve, a main valve seat, and a main valve support for supporting said flexible main valve to prevent substantial deflection of said main valve away from said seat when liquid pressure from the supply means is released from said refill valve, a portion of said main valve support being disposed within said main valve for engaging the interior periphery of said main valve and for limiting the amount of deflection of said main valve in a direction away from said main valve seat, a lower portion of said valve support extending exteriorly of said main valve to provide a substantially circumferential support about lower external periphery of said main valve for limiting peripheral deflection of said main valve.

7. The battery refill system of claim 1, each of the plurality of refill valves including a main valve and main valve seat for controlling the supply of liquid to the battery cells, the valves further comprising:

a lower valve housing supporting said main valve and said main valve seat;

an upper cap housing providing fluid communication between the external liquid supply means and the main valve;

said lower and upper housings being joined together by a manual releasable connection forming a unified valve assembly which is removably insertable into said container;

said main valve seat being joined to said lower valve housing by a fixed connection such that the operating pressure of said main valve acting to separate the upper and lower housings is confined to act over a relatively small area of the interior surface of said upper cap housing, said fixed connection having sufficient strength to substantially withstand the force generated by said operating pressure action on said main valve, thereby minimizing the force acting to separate the upper and lower housings at said manual releasable connection.

8. The battery refill system of claim 1, wherein said conduit means is sufficiently conformable and resilient so as to remain in leak-tight engagement of compression fittings over said service temperature range.

* * * * *

UNITED STATES PATENT AND TRADEMARK OFFICE
CERTIFICATE OF CORRECTION

PATENT NO. : 5,284,176
DATED : February 8, 1994
INVENTOR(S) : Daniel Campau

It is certified that error appears in the above-identified patent and that said Letters Patent are hereby corrected as shown below:

Column 2, Line 49    ("TYPES") should be ("TPEs")

Signed and Sealed this

Nineteenth Day of March, 1996

Attest:

BRUCE LEHMAN

Attesting Officer                Commissioner of Patents and Trademarks